United States Patent
Legros et al.

(10) Patent No.: US 8,920,136 B2
(45) Date of Patent: Dec. 30, 2014

(54) SEAL ARRANGEMENT FOR TURBOMACHINE

(75) Inventors: Craig R. Legros, Rockford, IL (US); Aaron M. Finke, Janesville, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 340 days.

(21) Appl. No.: 13/347,805

(22) Filed: Jan. 11, 2012

(65) Prior Publication Data
US 2013/0177405 A1 Jul. 11, 2013

(51) Int. Cl.
*F04B 17/03* (2006.01)

(52) U.S. Cl.
USPC ............. 417/357; 417/423.7; 417/53; 310/86

(58) Field of Classification Search
CPC ............ F04D 13/0606; F04D 13/0626; F04D 13/062; F04D 13/08; F04D 13/086; F04D 29/086
USPC ............ 417/423.1, 423.7, 423.3, 423.11, 357
See application file for complete search history.

(56) References Cited

U.S. PATENT DOCUMENTS

| | | | |
|---|---|---|---|
| 2,537,800 A * | 1/1951 | Stoeckly | 188/296 |
| 3,143,676 A * | 8/1964 | Niemkiewicz | 310/86 |
| 3,475,033 A | 10/1969 | Voitik | |
| 4,475,873 A | 10/1984 | Jensen et al. | |
| 4,850,812 A * | 7/1989 | Voight | 417/271 |
| 4,981,420 A | 1/1991 | Jensen et al. | |
| 5,220,233 A * | 6/1993 | Birch et al. | 310/156.28 |
| 6,189,313 B1 | 2/2001 | Cass et al. | |
| 6,727,609 B2 | 4/2004 | Johnsen | |
| 6,884,043 B2 * | 4/2005 | Kimberlin et al. | 417/355 |
| 6,986,647 B2 * | 1/2006 | Jones et al. | 417/357 |
| 7,352,090 B2 | 4/2008 | Gustafson et al. | |
| 7,573,169 B2 | 8/2009 | Ihle et al. | |
| 7,732,953 B2 | 6/2010 | Telakowski | |
| 7,859,146 B2 | 12/2010 | Robinson et al. | |
| 8,492,946 B2 * | 7/2013 | Vedy | 310/112 |
| 2006/0175565 A1 | 8/2006 | Nungesser et al. | |
| 2008/0209914 A1 * | 9/2008 | De Wergifosse et al. | 62/5 |

\* cited by examiner

*Primary Examiner* — Charles Freay
(74) *Attorney, Agent, or Firm* — Carlson, Gaskey & Olds, P.C.

(57) ABSTRACT

A turbomachine includes a motor including a rotor assembly and a stator assembly. A sleeve fluidly separates the rotor assembly from the stator assembly. The sleeve has first and second ends axially spaced from one another. In one example, first and second seals are arranged at the first end and fluidly separate the rotor assembly from the stator assembly. The second seal is arranged downstream from the first seal relative to the rotor assembly. In another example, the sleeve includes wet and dry sides. A first seal is arranged at the first end on the wet side. A drain is provided in the housing and arranged in a region downstream from the first seal. The drain fluidly connects the region to an exterior of the housing.

17 Claims, 2 Drawing Sheets

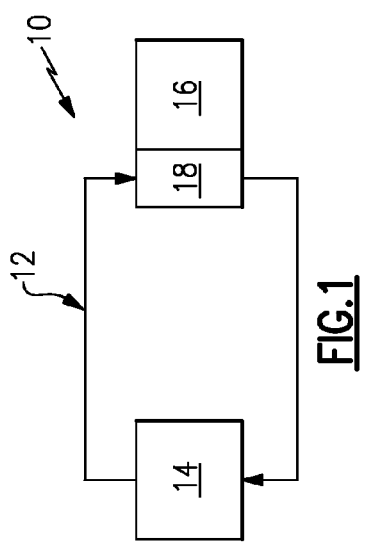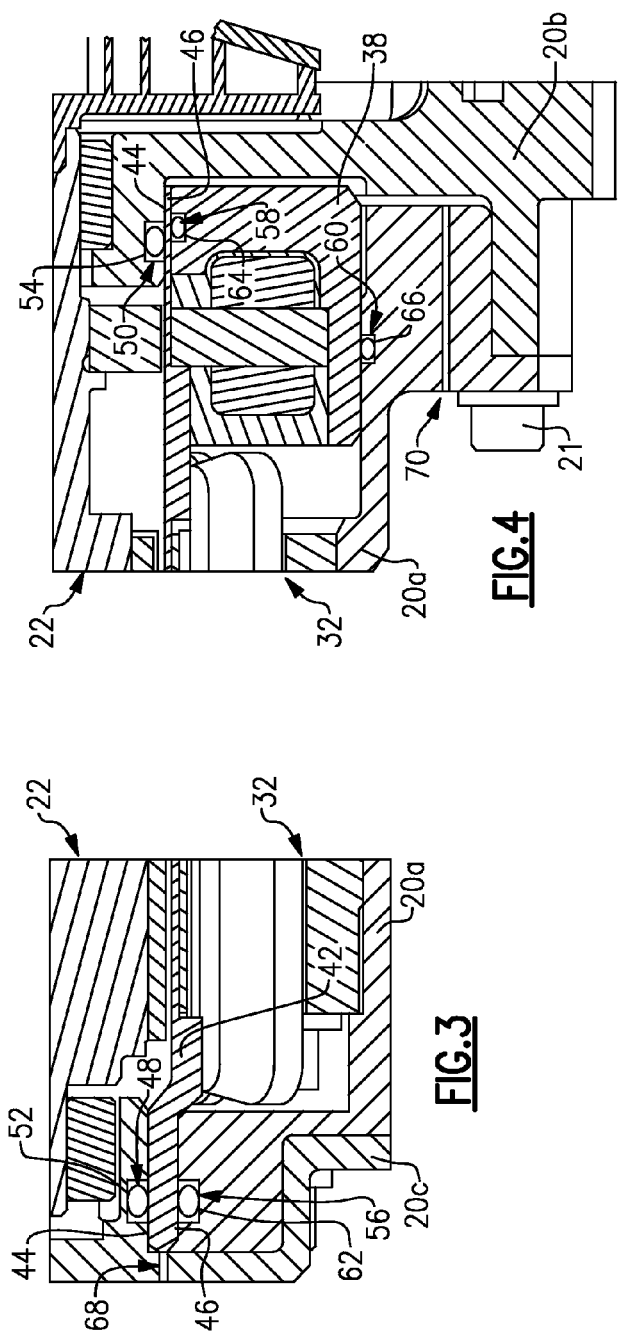

SEAL ARRANGEMENT FOR TURBOMACHINE

BACKGROUND

This disclosure relates to a turbomachine for use in a fluid system, for example, used in cooling. More particularly, the disclosure relates to a fluid separation configuration for maintaining wet and dry sides within the turbomachine.

One aerospace cooling system incorporates a pump that circulates a coolant through a power electronics cooling system. A propylene glycol/water (PGW) mix is used as coolant, which is electrically conductive.

The pump includes a rotor assembly and a stator assembly separated by a sleeve, which provides wet and dry sides. The rotor assembly and its supporting bearings are provided on the wet side, and the stator assembly is provided on the dry side. The sleeve must prevent the coolant from migrating to the dry side since the electrically conductive coolant can short the stator assembly. To this end, a seal is arranged at either axial end of the sleeve between an inner diameter of the sleeve, on the wet side, and the pump's housing.

SUMMARY

A turbomachine includes a motor including a rotor assembly and a stator assembly. A sleeve fluidly separates the rotor assembly from the stator assembly. The sleeve has first and second ends axially spaced from one another. In one example, first and second seals are arranged at the first end and fluidly separate the rotor assembly from the stator assembly. The second seal is arranged downstream from the first seal relative to the rotor assembly.

In another example, the sleeve includes wet and dry sides. A first seal is arranged at the first end on the wet side. A drain is provided in the housing and arranged in a region downstream from the first seal. The drain fluidly connects the region to an exterior of the housing.

One example method of assembling the turbomachine 12 includes installing the seals 48, 50 between the sleeve 42 and the housing 20 at the wet side 45 on first and second opposing ends of the sleeve 42. Seals 56, 58 are installed between the sleeve 42 and housing 20 on the dry side 47 of the sleeve 42 at the first and second ends. The sleeve 42 is arranged within the housing 12 to fluidly separate the rotor assembly 22 from the stator assembly 32.

A cooling system includes a turbomachine having a housing enclosing a rotor assembly and a stator assembly. The rotor assembly is configured to communicate with a conductive fluid. A sleeve separates the rotor assembly and the stator assembly. A seal engages the sleeve and is configured to retain the conductive fluid on a first side of the sleeve. A drain is provided in the housing arranged fluidly downstream from the seal.

BRIEF DESCRIPTION OF THE DRAWINGS

The disclosure can be further understood by reference to the following detailed description when considered in connection with the accompanying drawings wherein:

FIG. 1 is a schematic view of an example fluid system.

FIG. 3 is an enlarged view of the one portion of the turbomachine shown in FIG. 2.

FIG. 4 is an enlarged view of another portion of the turbomachine shown in FIG. 2.

DETAILED DESCRIPTION

Figure 2:
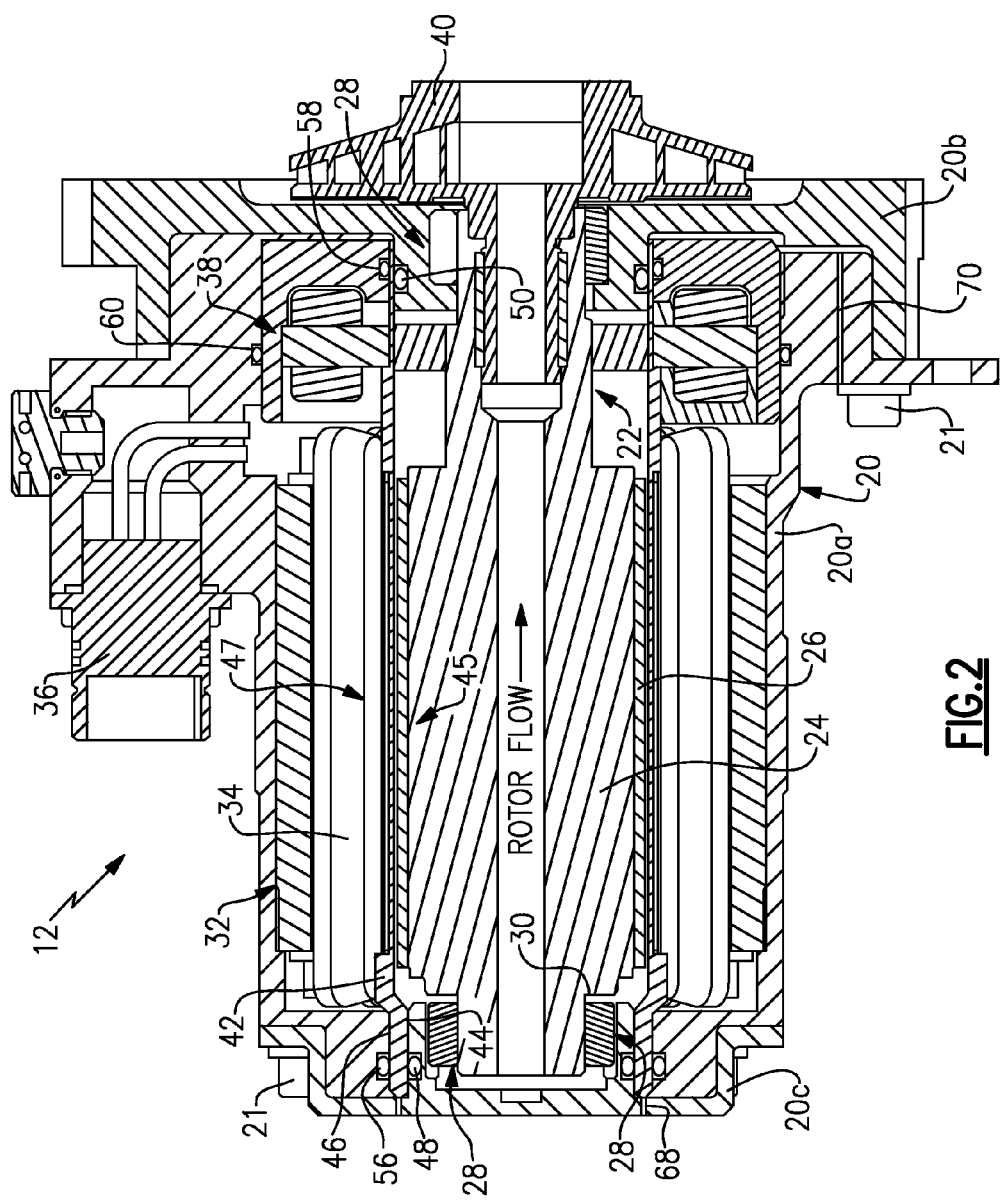
FIG. 2 is a cross-sectional view of an example turbomachine.

A fluid system 10 is schematically shown in FIG. 1. The system 10 includes a turbomachine 12 that circulates a fluid through a fluid circuit 14, and, for example, to a heat exchanger 18 that is used to cool a device 16. In one example, the fluid system 10 is an aircraft cooling system, and the device 16 is a power electronics cooling system. The heat exchanger 18 is used to cool the electronics of the device 16. The turbomachine may be any suitable configuration.

An example turbomachine 12 is illustrated in FIG. 2. The turbomachine 12 includes a housing 20 constructed from multiple housing portions 20A, 20B, 20C secured to one another with fasteners 21. More or fewer housing portions may be used. In one example, the housing 20 is constructed from aluminum. A rotor assembly 22 is arranged within the housing 20. The rotor assembly 22 includes a shaft 24 rotatable about an axis and supported by journal bearings 28 at opposing ends and a thrust bearing 30. Permanent magnets 26 are supported on the shaft 24.

A stator assembly 32 is arranged about the rotor assembly 22 and includes windings 34. An electrical connector 36 is electrically connected to the windings 34. Current through the windings 34 excites the permanent magnets 26 and imparts rotation to the rotor assembly 22 to rotationally drive a pumping element 40, which may be an impeller or gerotor, arranged at an end of the shaft 24. A resolver assembly 38 may be used to measure the degrees of rotation of the rotor assembly 22, as desired.

A sleeve 42, cylindrical in shape, is arranged between the rotor assembly 22 and the stator assembly 32 to separate first and second sides 45, 47 that respectively correspond to wet and dry sides. In one example, the shaft 24 is hollow providing a portion of a fluid passage that permit the coolant to flow from the pumping element 40 and within the first side 45 to lubricate and cool the bearings 28, 30, which may be provided by an integrated journal and thrust bearing in the example. Coolant must be prevented from migrating to the second side 47 if electrically conductive, such as PGW, which would short the stator assembly 32. The sleeve 42 includes an inner surface 44 and an outer surface 46 respective at the first and second sides 45, 47. Third and first seals 48, 50 are arranged at axially opposing ends of the sleeve 42 on the wet side to provide a seal between the sleeve 42 and the housing 20. In the example illustrated, housing portion 20C includes a third groove 52 that receives the third seal 48 and housing portion 20B includes a first groove 54 that receives the first seal 50.

In applications where it is desirable to reduce the weight of the turbomachine 12 as much as possible, a plastic sleeve 42 may be utilized. In one example, the sleeve 42 is constructed from polyether ether ketone (PEEK). A plastic sleeve may be subject to deflection under pressure of the coolant on the first side 45. As the sleeve 42 deflects, it may be possible that some coolant may migrate past the third and first seals 48, 50. To this end, additional seals may be used to prevent further migration of the coolant into the second side 47. For example, a fourth seal 56 is arranged in a fourth groove 62 in the third housing portion 20C radially outwardly from the third seal 48 and downstream from the third seal 48 to provide a seal between the outer surface 46 and the housing 20.

The resolver assembly 38 includes a second groove 64 receiving a second seal 58 that seals relative to the outer surface 46. A fifth groove 66 in the housing portion 20A includes a fifth seal 60 that seals relative to the resolver assembly 38. The second and fifth seals 58, 60 are arranged downstream from the first seal 50. In the example, first, second, third, fourth and fifth seals 50, 58, 48, 56, 60 are elastomeric O-rings constructed from a material compatible with PGW, for example.

To relieve the pressure and evacuate any fluid that might leak past the third and first seals 48, 50, first and second drains 68, 70 are provided at either end of the sleeve 42. The first drain 68 is provided in a region between the third and fourth seals 48, 56 and fluidly connects the region to an exterior of the housing 20. The second drain 70 is provided in a region between the first and fifth seals 50, 60 and fluidly connects the region to the exterior of the housing 20. Thus, coolant that leaks past the third and first seal 48, 50 is permitted to drain from the housing 20 and overboard, thereby preventing the coolant from building pressure behind the fourth, second and fifth seals 56, 58, and 60. In this manner, undesired sleeve deflection is reduced.

One example method of assembling the turbomachine 12 includes installing the seals 48, 50 between the sleeve 42 and the housing 20 on the wet side 45 at first and second opposing ends of the sleeve 42. Seals 56, 58 are installed between the sleeve 42 and housing 20 on the dry side 47 of the sleeve 42 at the first and second ends. The sleeve 42 is arranged within the housing 12 to fluidly separate the rotor assembly 22 from the stator assembly 32.

Although an example embodiment has been disclosed, a worker of ordinary skill in this art would recognize that certain modifications would come within the scope of the claims. For that reason, the following claims should be studied to determine their true scope and content.

What is claimed is:

1. A turbomachine comprising:
a motor including a rotor assembly rotatable about an axis relative to a stator assembly;
a sleeve fluidly separating the rotor assembly from the stator assembly, the sleeve having first and second ends axially spaced from one another, wherein the sleeve separates wet and dry sides, the rotor assembly arranged on the wet side and the stator assembly arranged on the dry side, wherein the sleeve includes inner and outer diameters respectively provided on the wet and dry sides; and
first and second seals arranged at the first end and fluidly separating the rotor assembly from the stator assembly, the second seal arranged fluidly downstream from the first seal relative to the rotor assembly, the first and second seals respectively engaging the inner and outer diameters; and
a drain arranged in a region fluidly between the first and second seals, and the drain fluidly connects the region to an exterior of the turbomachine.

2. The turbomachine according to claim 1, comprising a pumping element supported on the rotor assembly, and a fluid passage providing the fluid passage from the pumping element to the rotor assembly, and the first and second seals sealing the fluid passage from the stator assembly.

3. The turbomachine according to claim 2, comprising bearings supporting the rotor assembly relative to a housing, the bearings in fluid communication with the fluid passage.

4. The turbomachine according to claim 1, wherein the sleeve is constructed from a plastic material.

5. The turbomachine according to claim 4, wherein the plastic material is polyether ether ketone (PEEK).

6. The turbomachine according to claim 1, comprising a housing enclosing the rotor assembly and the stator assembly, the first and second seals engaging the housing.

7. The turbomachine according to claim 6, wherein first and second grooves are provided in the housing, the first and second grooves respectively receiving the first and second seals.

8. The turbomachine according to claim 6, comprising third and fourth seals are arranged at the second end, and fluidly separate the rotor assembly from the stator assembly.

9. The turbomachine according to claim 8, comprising a resolver communicating with the rotor assembly, the second seal engaging the resolver.

10. The turbomachine according to claim 8, wherein the drain is provided in the housing.

11. The turbomachine according to claim 8, wherein the third and fourth seals respectively engage inner and outer diameters of a sleeve.

12. The turbomachine according to claim 9, wherein a fifth seal seals relative to the resolver.

13. The turbomachine according to claim 12, wherein the fifth seal is arranged downstream from the second seal relative to the rotor assembly.

14. The turbomachine according to claim 1, wherein the first and second seals are elastomeric O-rings.

15. A method of assembling a turbomachine comprising:
installing first and third seals between a sleeve and a housing an on a wet side of the sleeve at first and second opposing ends of the sleeve;
installing second and fourth seals between the sleeve and the housing on a dry side of the sleeve opposite the wet side at the first and second ends; and
arranging the sleeve within the housing to fluidly separate a rotor assembly and a stator assembly from one another, wherein the first and second seals respectively engage inner and outer diameters of the first end, and a drain is arranged in a region fluidly between the first and second seals, the drain fluidly connects the region to an exterior of the turbomachine.

16. A cooling system comprising:
a turbomachine having a housing enclosing a rotor assembly and a stator assembly, the rotor assembly configured to communicate with a conductive fluid;
a sleeve separating the rotor assembly and the stator assembly;
first and second seals engaging an end of the sleeve and configured to retain the conductive fluid on a first side of the sleeve; and
a drain provided in the housing arranged fluidly between the first and second seals.

17. The cooling system according to claim 16, comprising a power electronics device fluidly connected to the turbomachine by a fluid circuit providing the conductive fluid.

* * * * *